US012802052B2

(12) United States Patent
Englebardt et al.

(10) Patent No.: US 12,802,052 B2
(45) Date of Patent: Nov. 17, 2026

(54) SYSTEM AND METHOD FOR FACILITATING CLOUD-BASED TRANSACTIONS AT FINANCIAL SELF-SERVICE TERMINALS

(71) Applicant: E-Squared Systems, Inc., Santa Fe, NM (US)

(72) Inventors: Leland S. Englebardt, Santa Fe, NM (US); Donna L. Embry, Louisville, KY (US)

(73) Assignee: E-Squared Systems, Inc., Santa Fe, NM (US)

( * ) Notice: Subject to any disclaimer, the term of this patent is extended or adjusted under 35 U.S.C. 154(b) by 0 days.

(21) Appl. No.: 18/407,921

(22) Filed: Jan. 9, 2024

(65) Prior Publication Data

US 2024/0232838 A1 Jul. 11, 2024

Related U.S. Application Data

(60) Provisional application No. 63/437,857, filed on Jan. 9, 2023.

(51) Int. Cl.
*G06Q 20/10* (2012.01)
*G06Q 20/40* (2012.01)

(52) U.S. Cl.
CPC ......... *G06Q 20/108* (2013.01); *G06Q 20/401* (2013.01)

(58) Field of Classification Search
CPC .......................... G06Q 20/108; G06Q 20/401
USPC .......................................................... 705/42
See application file for complete search history.

(56) References Cited

U.S. PATENT DOCUMENTS

2017/0148019 A1 * 5/2017 Carrott ................ G06Q 20/202
2021/0272105 A1 * 9/2021 Bergeon ................ G06Q 20/40

* cited by examiner

*Primary Examiner* — Ambreen A. Alladin
(74) *Attorney, Agent, or Firm* — Carter Ledyard & Milburn LLP

(57) ABSTRACT

A system and method for facilitating transactions and payments with a remote computing device includes one or more processors configured to interact with a computer-readable medium for performing operations, the operations comprising receiving a transaction request to move funds or to obtain information in furtherance of a transaction between a purchaser and a vendor. Additionally, the system and method each include receiving a transaction notification at the remote computing device, the transaction notification comprising a payment amount that is relevant to the transaction that is the subject of the transaction notification; generating a unique identifier, the unique identifier corresponding to the transaction notification; providing the unique identifier to the remote server in furtherance of the transaction receiving an input of the unique identifier at the remote server; executing the transaction request on behalf of a financial self-service terminal; and notifying an account holder and/or application vendor of execution of the transaction.

6 Claims, 6 Drawing Sheets

SYSTEM AND METHOD FOR FACILITATING CLOUD-BASED TRANSACTIONS AT FINANCIAL SELF-SERVICE TERMINALS

TECHNICAL FIELD

This disclosure relates to transaction processing and, more particularly, to systems and methods of facilitating cloud-based transactions at financial self-service terminals.

BACKGROUND

The first automated teller machines (ATMs) were deployed by banks in the United Kingdom and the United States in the 1960s and performed one function: dispensing cash. There are now millions of ATMs and other Financial Self-Service Terminals (FSTs) worldwide, deployed by banks and independent operators in every country. ATMs are connected to the Internet to enable communication with the banks, payment networks and service providers that facilitate transactions. ATMs and other FSTs are designed as self-contained computers, with all application programs (programs that perform cash disbursement, balance inquiry, currency conversion, bill payment, etc.; individually and collectively Functions) fully housed within the FST and all device operations fully actuated from within the FST.

The ATM was one of the most transformative inventions of the twentieth century. ATMs enable people worldwide to access cash and banking services 24 hours a day, in convenient locations, with high security, and with absolute equality of access (especially important in parts of the world where certain segments of the population confront financial exclusion based on gender, race, or other characteristics). Every year, more than ten billion ATM transactions are performed at the 450,000 ATMs in the United States. But ATMs now confront an existential problem: the fundamental architecture of the machine has not changed materially in half a century. ATMs are still self-contained computers that must house all the software and processing capacity to support the functions they perform. In a world of rapidly expanding financial services and consumer needs, it is technically challenging and economically unviable for ATMs and ATM operators to support new and more complex functions, for example, buying and selling digital currency, bill payment, transactions in foreign currencies, and supporting cash payments for electronic commerce transactions. In addition, ATMs and other FSTs are under constant attack from criminals who seek to manipulate the device using increasingly sophisticated electronic tools to hijack the terminal's command structure.

Over time, as more sophisticated methods of attacking computing devices have been developed, this legacy system architecture has become a liability; internally generated commands are trusted by the machine and criminals who take control of the application software residing inside the FST can cause the FST to dispense cash at will.

Moreover, as the range of desired FST functions and transactions has expanded, it has become more complex and costly to enable FSTs to contain all the Functions that would enable them to perform a complete range of different transactions that consumers desire. FSTs require more flexible and powerful application software, more computing and memory capacity to support the software, more security to prevent unauthorized manipulation of the device, and more frequent maintenance and upgrades to keep all applications current.

This situation, if left unchanged, would result in fewer consumers using FSTs and fewer FSTs available for consumers to use, as increasing vulnerability to fraud and decreased use makes more and more FSTs financial losers for the banks and independent operators that deploy them. Over time, this will diminish cash access for all consumers, which will exacerbate financial exclusion of low-income populations that rely on cash to conduct their lives.

Nowadays, with the vigorous development of information and communication technology, as well as encrypted security "handshakes" that ensure the veracity of communications between a terminal and a remote host, it is common for users to transmit the data stored in one electronic apparatus to another one in order to perform further operation. Moreover, data sharing and transmission between electronic apparatuses can create many practical and convenient applications, expand the capabilities of the apparatus, and improve the security of financial transactions.

Also, with the continued proliferation of the Internet and Internet-connected devices, (e.g., smartphones, computers, etc.), it has become increasingly possible for Functions to be housed outside the FST device itself. Devices can perform operations based on instructions received from programs that reside on a computer or information storage device located elsewhere (the Cloud) and accessed via the Internet. The Cloud approach reduces the level of effort required to enable FSTs to perform multiple different transactions, reduces the quantity of information that must be stored on the FST, reduces the processing capacity within the FST required to perform multiple transactions, and both reduces the communications burden on the FST and enhances the security of financial transactions performed using the FST, by reducing the number of different communications endpoints the FST must utilize. The cloud approach also enables a proprietary security code to be used to trigger FST functions, which diminishes the ability of criminals to take control of the FST and cause it to dispense cash or send money without proper authorization. It can be appreciated that FST operators are able to reduce their costs and improve their service offerings to consumers by utilizing the benefits of the Cloud.

The present disclosure, which includes relocation of the processing for ATMs and other FSTs to a remote host, solves those problems and enables FSTs to offer more services, with greater security, and at lower cost. The present disclosure simplifies the FST's internal software architecture and thereby reduces the utilization of the FST's internal processing hardware and memory capacity. It also introduces security to critical internal FST functions that are now insecure. The present disclosure eliminates the need for continual, costly, and complex upgrades—either to the FST's internal processing hardware and software or replacement of the entire machine, when the FST cannot be upgraded due to its age or design—that deter FST operators from offering additional financial services desired by consumers. The additional security provided by this disclosure may also enable FST operators to locate FSTs in places that are not viable for FSTs using current operating systems. The present disclosure may enable tens of thousands of active FSTs deployed throughout the United States and elsewhere to continue serving consumers for the long-term future, rather than being junked by their operators due to rising operating costs.

In addition to reducing the costs to operate an FST, this disclosure may convert unpredictable, large, variable costs into a fixed, smaller, recurring subscription cost, thereby simplifying and improving the business model for the banks and independent local businesses that own and operate FSTs. That could lead to expanded distribution of FSTs and, consequently, greater public access to financial services and financial inclusion.

In summary, when an individual wishes to deposit, withdraw, or transfer funds, an FST would typically be used to facilitate such transactions. As FSTs modernize and expand their functions, additional components, including hardware and other electrical items, become necessary for modern FSTs to perform quickly, efficiently, and accurately. Typically, these additional components are housed inside the actual, physical housing of the FSTs, which creates issues and burdens involving: the physical spacing available inside the FSTs, the computing and memory capacity required to support the software and hardware of the FST, the security concerning unauthorized manipulation of the FST, and maintenance of the FST.

Prior to this disclosure, attempts to solve the above issues and burdens came in forms of developing FSTs having card-verifying attributes, improved FST housings that deter unauthorized access to an FST's internal hardware, and updated patches to an FST's software. Another option was to minimize software maintenance factors of FSTs.

It is with respect to these and other considerations that the disclosure made herein is presented.

SUMMARY OF THE DISCLOSURE

Technologies are presented herein in support of a system and method for facilitating FST transactions based on functions housed remotely in the Cloud. According to a first aspect, a method for facilitating payment, including both receipt of payment by the purchaser (for example, an ATM cash disbursement) and/or a payment by the purchaser to a vendor (for example, bill payment or purchase of crypto currency) using a computing device is provided. The method is responsive to a selection by a purchaser that enables generation of a payment submission in furtherance of a transaction between the purchaser and a vendor, by transmitting a transaction notification from the FST to a remote computing device. The transaction notification includes a payment amount and corresponding designation of the transaction type. The method also generates, with a remote processor executing code, a unique secure identifier which corresponds to the transaction notification. The method provides the unique secure identifier to the FST to enable execution of the payment submission in furtherance of the transaction.

In one implementation, a method for facilitating transactions with a remote computing device is based on receiving a transaction notification or request at a remote computing device, in response to a selection by a purchaser, for generating a request submission and for moving funds or to obtaining information in furtherance of a transaction between a purchaser and a vendor. A request notification may include a unique secure identifier which corresponds to the request. The method may also include receiving a transaction notification at the remote computing device, the transaction notification comprising a payment amount that is relevant to the transaction that is the subject of the transaction notification; generating a unique identifier, the unique identifier corresponding to the transaction notification or request notification; and providing the unique identifier to a service provider to facilitate remote processing of the information in furtherance of the transaction. The unique identifier may be associated with a specific FST and a specific remote server.

One or more of the following features may be included. The method may include receiving an input of the unique identifier at a remote server, wherein the unique identifier corresponds to the transaction notification and actuates business applications to perform the transaction request. The method may include the transaction request being submitted for information and for notifying the vendor and/or an account holder. The method may include eliciting the transaction request at an automated teller machine and processing the transaction request at the remote server.

In another implementation, a method for facilitating transactions with a remote computing device, which is responsive to a selection by a purchaser that actuates a payment submission by a specified Terminal Agent resident in the FST, is based on receiving a transaction request to move funds or to obtain information in furtherance of a transaction between a purchaser and a vendor. The method includes receiving a transaction notification at the remote computing device, the transaction notification comprising a payment amount that is relevant to the transaction that is the subject of the transaction notification; generating a unique transaction initiation message, in a format specified and implemented by the manufacturer of the FST, the unique message corresponding to the transaction, thereby actuating function of a remote Terminal Manager, which resides in a central and remote server, in order to facilitate communication of transaction instructions from the Terminal Manager to the Terminal Agent in furtherance of the transaction; and associating the unique identifier with a user account to facilitate completion and record-keeping.

In another implementation, a system for facilitating transactions and payments with a remote computing device is based on one or more processors configured to interact with a computer-readable medium for performing operations. The system includes operations comprising the receiving of a transaction request to move funds or to obtain information in furtherance of a transaction between a purchaser and a vendor; receiving a transaction notification at the remote computing device, the transaction notification comprising a payment amount that is relevant to the transaction that is the subject of the transaction notification; generating a unique identifier, the unique identifier corresponding to the transaction notification; providing the unique identifier to the remote server in furtherance of the transaction; receiving an input of the unique identifier at the remote server; executing the transaction request on behalf of a financial self-service terminal; and notifying an account holder and/or application vendor of execution of the transaction.

According to another aspect, a system is provided including one or more application programs configured to interact with and through the remote Terminal Manager in order to perform operations at the FST, including but not limited to: responsive to a selection by a purchaser, receiving a transaction notification at the remote computing device, the transaction notification including a payment amount and corresponding to the transaction, generating, with the Terminal Agent executing code, a cash disbursement, or a purchase of foreign currency or crypto currency, or a bill payment, or the purchase of digital currency, or the purchase of goods and services, all pursuant to the transaction type applications resident at the central and remote server.

According to another aspect, a system is provided including one or more remote monitoring programs and systems (RMS) configured to act with and through the remote Terminal Manager in order to keep under systematic review and record the operations of the FST, including but not limited to the nature and frequency of transactions performed at the FST, the operations of logical systems devices within the FST, the physical integrity of the FST and all its sub-parts (by way of example and not limitation, the mechanism for dispensing currency, the mechanism for reading payment cards presented at the FST, and the mechanism for capturing images of currency and checks deposited into the FST), the logical integrity of the FST (by way of example and not limitation, the integrity of security keys), and the alignment between logical instructions provided to the FST by the Terminal Manager and the nature of operations performed by the FST, all pursuant to the monitoring applications resident at the central and remote server.

According to another aspect, a system is provided including one or more proprietary software variants containing code that disables and/or eliminates software already residing in an FST, which pre-existing software enables the FST to perform operations independently, and replaces or overrides that pre-existing software with instructions that enable the FST to perform operations only in response to cryptographically verified commands from the Terminal Manager. These proprietary software variants may be introduced to the FST prior to commencement of commercial operations using the cloud-based remote hosting system and may transfer to the Terminal Manager the ability to control and monitor the future operations of the FST.

According to another aspect, a system is provided including one or more telecommunications programs configured to interact with and through the Terminal Manager in order to enable transmission and receipt of instructions and data between the Terminal Manager and the FST, and between the FST and the payment initiation device owned by the consumer who uses the FST. The telecommunications program or programs provide support for the ability of the Terminal Manager to control and monitor the operations of the FST.

The details of one or more implementations are set forth in the accompanying drawings and the description below. Other features and advantages will become apparent from the description, the drawings, and the claims.

BRIEF DESCRIPTION OF THE DRAWINGS

Various embodiments in accordance with the present disclosure will be described with reference to the drawings, in which.

DETAILED DESCRIPTION OF THE PREFERRED EMBODIMENTS

Figure 1:
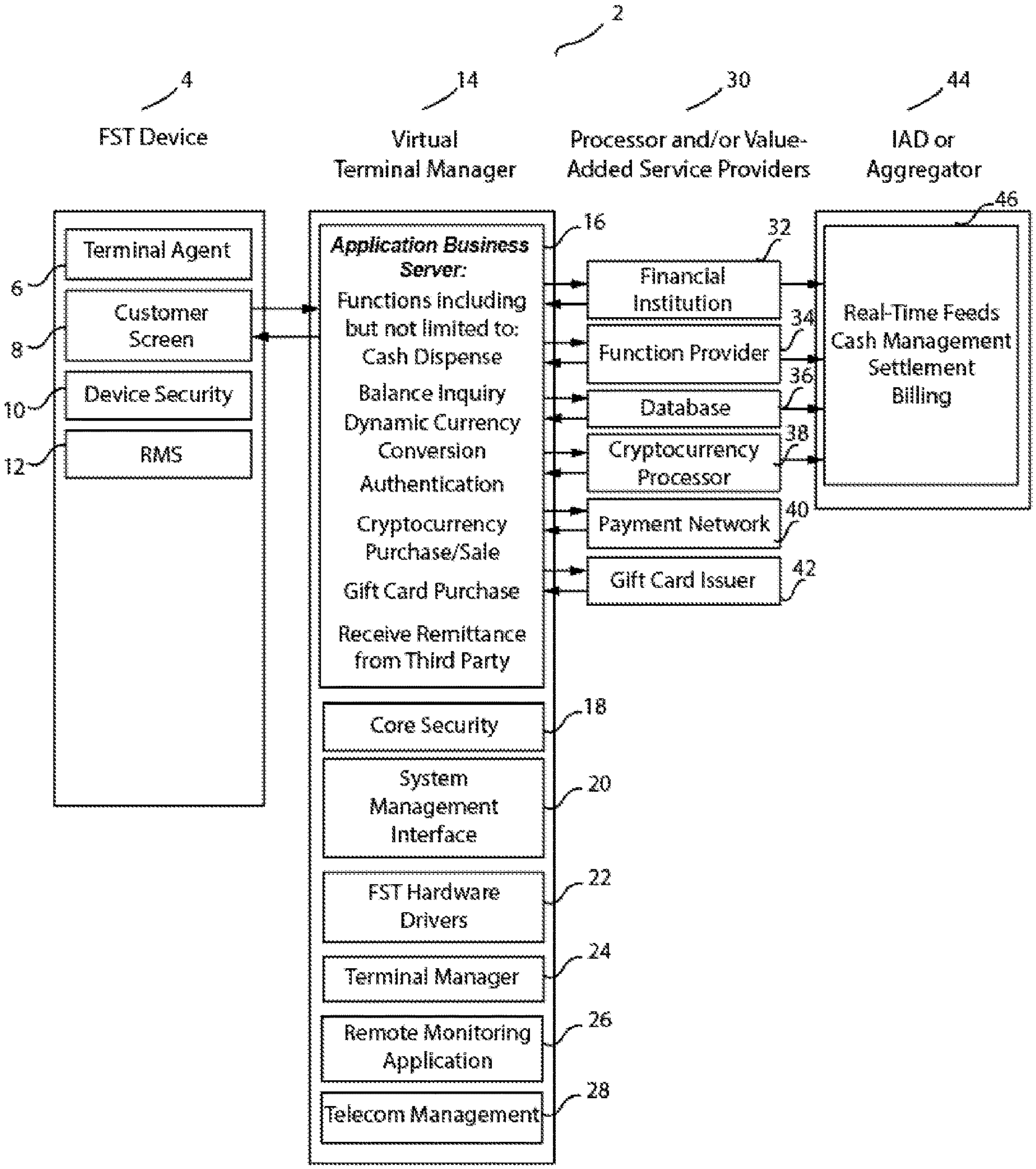
FIG. 1 illustrates an example of a system for facilitating cloud-based transactions at financial self-service terminals.

By way of overview and introduction, various systems and methods are described herein that facilitate and enable financial transactions via remote management of an FST. It can be appreciated that despite the many and growing number of self-service financial transactions that are available to be delivered to consumers via FSTs, only FST operators that are in possession of certain resources such as capital to upgrade or replace FSTs, technical expertise to modify and maintain FSTs, and human resources to accomplish the necessary modifications to enable additional functions, are able to deliver additional valuable financial transactions. However, FST operators that lack those assets and/or skills are effectively precluded from offering to consumers additional financial self-service capabilities. It can be appreciated that consumers who reside, work or travel to locations served by such FST operators are also effectively precluded from engaging in certain financial transactions that may be beneficial or necessary to them. As a result, financial services vendors fail to offer and capitalize on a number of potential transactions due to such challenges on the part of FST operators and consumers, and consumers are denied access to such transactions.

In an effort to enable such consumers to have more ubiquitous access to a broader range of financial self-service functions, with greater security, the systems and methods described herein enable a series of operations whereby a FST operator can enable its FSTs to deliver a greatly more diverse range of consumer financial functions, without major upgrades to the hardware and software of the FST, without taking on responsibility for hardware and software modifications to support more diverse and complex functions, and without the need to purchase costly new software for the FST. Instead, FST operators may link their FSTs to the Terminal Manager and utilize the application programs resident at the central server, via telecommunications links, to enable delivery of services. The consumer using the FST may initiate and conduct transactions in a traditional manner and the unique architecture and systems that enable the transactions to occur will be transparent to the consumer.

After the consumer selects the transaction type to be performed, instead of processing the transaction within the FST using software resident in the FST, the FST may transmit the transaction request to the remote server via a connection to the Terminal Manager. The remote server may conduct the transaction and generate a result that is transmitted to the FST via the Terminal Manager. The result may include instructions for the FST to perform a physical operation (for example, dispensing cash) and/or to display information to the consumer.

The result generated by the remote server may be encrypted and may include a security code that is transmitted to the FST via the Terminal Manager. The security code received by the FST may be matched by the FST with a corresponding security code to determine that the result is validly issued by the authorized remote server. Upon verification by the FST that the security codes match properly, the FST may decrypt the result and may act upon any instructions included in the result.

The following detailed description is directed to systems and methods for facilitating cloud-based transactions at FSTs. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process.

Thus, the selection of a hardware implementation versus a software implementation is one of design choice and left to the implementer. Furthermore, the terms and phrases used herein are not intended to be limiting, but rather are to provide an understandable description of the systems and methods.

Based on this selection, a message can be generated (containing elements such as the instructions to the FST and the security code) and transmitted from the FST to a central machine (the remote server) where a unique set of instructions (such as cash dispense, currency conversion, or display of the consumer's bank account balance) can be generated. The instructions can then be transmitted, as a representation of the transaction, to the FST.

The instructions are then acted upon by a conventional FST. Upon receiving the instructions and a unique secure identifier in the form of code, the FST can provide the consumer with the requested information or services without performing many of the computational processes now required of FSTs to deliver the same information or services. Many of the computational processes now performed by the FST may take place at the remote server. By doing so, the FST operator is able to reap the benefits of the set of transactions currently offered by the FST and the potential additional set of transactions supported by the remote server but not presently offered by the FST, without additional programming of the FST, without the need to upgrade the computing hardware capacities of the FST, and with additional protection against criminal manipulation of the FST provided by means of an encrypted security "handshake" between the FST and the remote server.

Referring to FIG. 1, there is shown a system 2 for facilitating transactions and payments with a remote computing device. The system may include an FST device 4, which may be an ATM or other similar device configured to facilitate financial transactions, wherein the FST device may include a terminal agent 6, a customer screen 8, a mechanism for device security 10, and remote monitoring services (RMS) 12. The terminal agent 6 may include various data and instructions for operating a financial transaction, such as inputted or stored data from a user, along with programmed steps in furtherance of a financial transaction. The customer screen 8 may be a user interface (e.g., with a touchscreen) with which a user may interact with or instruct the FST device. Device security 10 may include validation mechanisms, secured housing structures, and/or other security modules. RMS 12 may include technology, such as wireless transmitters, that would enable an FST operator to monitor aspects of FST device 4, regardless of whether FST device 4 is being employed by a user.

FST Device 4 may exchange information with a virtual terminal manager 14 to perform transaction-related functions via an application business server 16. The application business server 16 may be a platform middleware that may use such information to perform such functions. The functions may include dispensing cash, retrieving a balance amount via a balance inquiry, performing dynamic currency conversion, and authenticating data. The application business server 16 may also perform functions for non-fiat currencies, including cryptocurrency sales and/or purchases. The application business server 16 may further interact with third parties, so as to, for example, receive remittance from a third-party or facilitate with purchasing gift cards.

The virtual terminal manager 14 may include core security mechanisms 18 to safeguard the virtual terminal manager 14 from unauthorized access; a system management interface 20 to assist a user in navigating a menu within the virtual terminal manager 14; FST hardware drivers 22 for operating or controlling one or more devices within the FST device 4; a terminal manager 24 configured to oversee activities of the virtual terminal manager 14 as well as to facilitate communication of transaction instructions from the Virtual Terminal Manager 14 to the Terminal Agent 6 in furtherance of the transaction; a remote monitoring application 26 that may enable the virtual terminal manager to be monitored from a remote location; and telecom management 28 for managing open systems in a communications network and for providing support the Virtual Terminal Manager 14 to control and monitor the operations of the FST.

Aspects of the Virtual Terminal Manager 14, such as the Application Business Server 16, may exchange information with a processor or value-added service providers 30 which facilitate transactions. A financial institution 32 may provide services as intermediaries for different transactions; a function provider 34 that may assist in activities directed to business finances; a database 36 that may store or transfer data; a cryptocurrency processor 38 that may process cryptocurrency data obtained from the Virtual Terminal Manager 14; a payment network 40 which may be used to settle financial transactions; and a gift card issuer 42 that may create and provide gift cards to users.

The financial institution 32, the function provider 34, the database 36, and the cryptocurrency processor 38 may deliver information to an independent ATM deployer (IAD) or Aggregator 44 to enable FSTs to, for example, display real-time feeds, cash management-related information, financial settlement information, or billing information (numeral 46).

Figure 2:
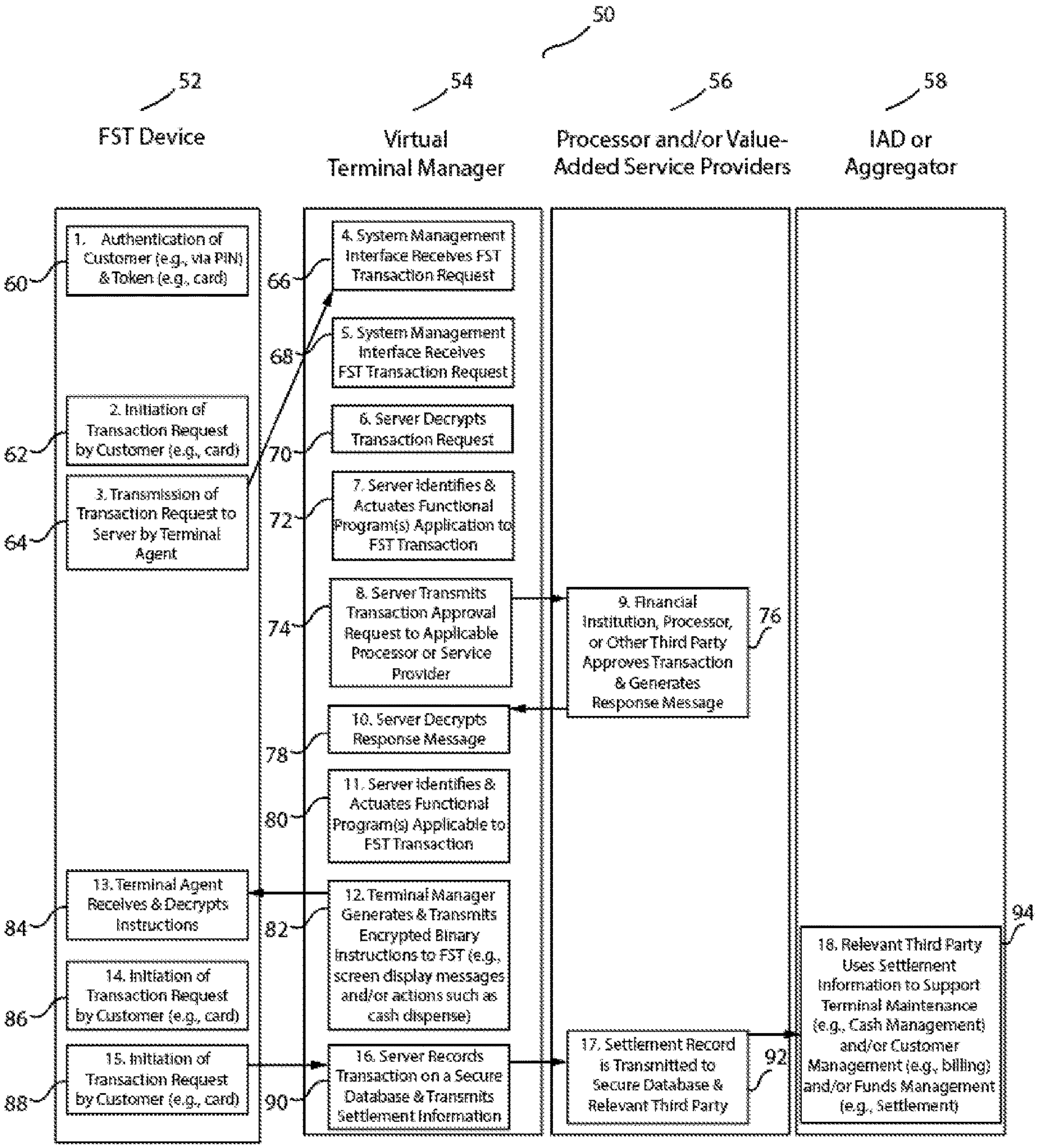
FIG. 2 illustrates an example of a method of facilitating cloud-based transactions at financial self-service terminals.

Referring to FIG. 2, there is shown a method flowchart 50 for facilitating cloud-based transactions at financial self-service terminals. The method may begin at an FST Device stage 52, wherein the device authenticates a customer or user and their token (e.g., via a pin code and via a debit card or debit card information transmitted by a customer's mobile device) (step 60). Following authentication, a transaction request may be initiated by the user (step 62), which subsequently may lead to a transaction request transmission to a server via a terminal agent (step 64). The server may be a server housing a virtual terminal manager (numeral 54).

Once the transaction request transmission reaches the server, a system management interface may receive the transaction request (step 66) and authenticate the transaction request (step 68). The server may then decrypt the transaction request (step 70), identify the transaction request (step 72), actuate functional programs applicable to a transaction of the transaction request (also in step 72), and transmit a transaction approval request to a processor and/or service provider 56 (step 74).

The processor and/or service provider 56 (which, for example, may include a financial institution, a processor, or other third-party) may then approve the transaction transmitted from the system management interface and generate a response message to the server (step 76). The server may then decrypt the response message (step 78), and identify and actuate functional programs applicable to the response message and to a relevant FST transaction (step 80). The terminal manager may then generate and transmit encrypted binary instructions to FST device 52 (step 82), from wherein the terminal agent receives and decrypts the binary instructions (step 84). The terminal of FST device 52 may then act on the binary instructions (step 86) and transmit a transaction completion message to the server (step 88).

The server may then record the completed transaction on a secure database (step 90) and then transmit settlement information to the processor and/or service provider 56 (also step 90). The settlement information may then be transmitted to another secure database and/or a relevant third-party (step 92). The relevant third-party (e.g., an IAD or aggregator) may use the settlement information to support maintenance of the terminal of FST device 52 (step 94) (e.g., cash management, customer management, billing, fund management, etc.).

Figure 3:
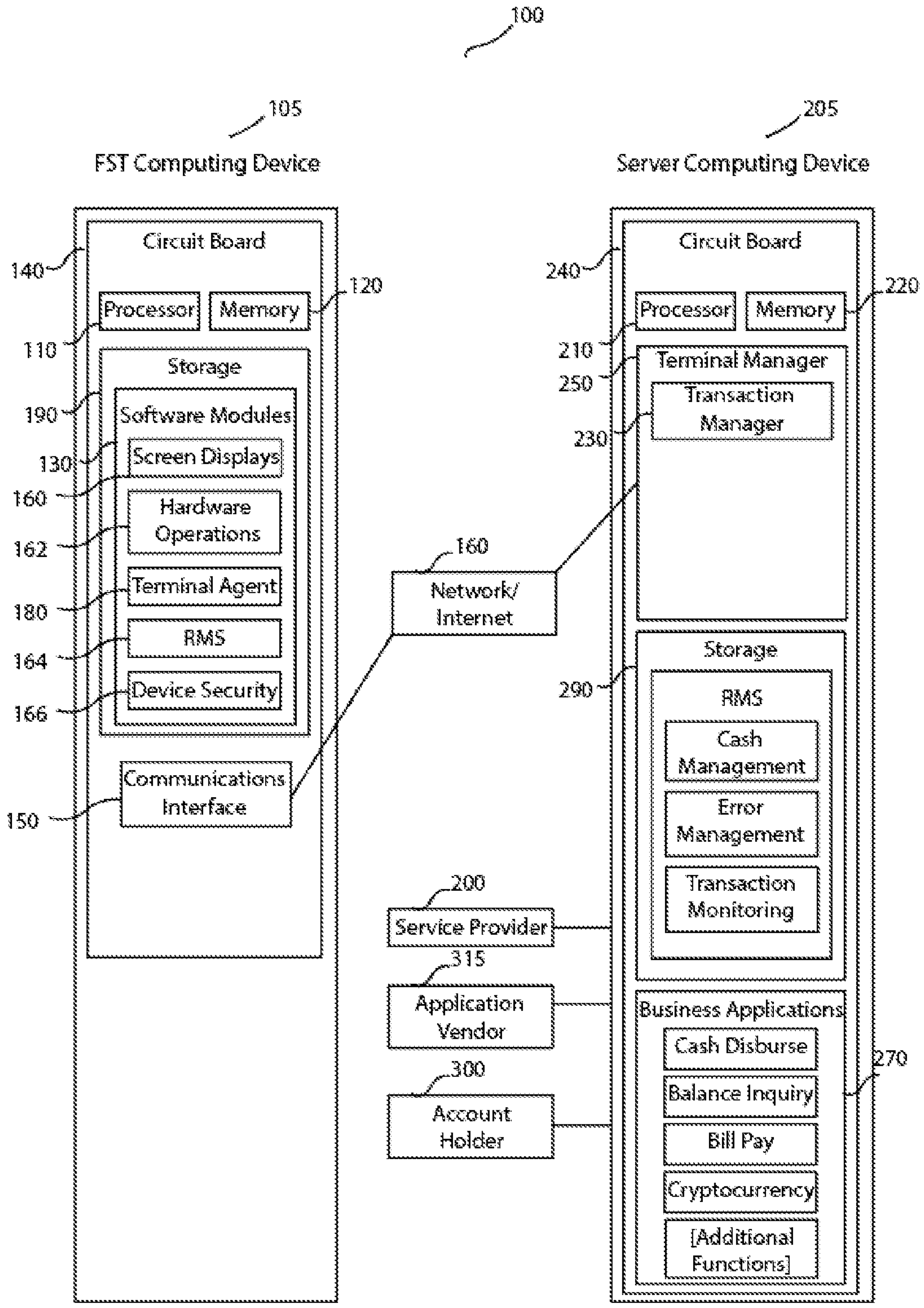
FIG. 3 illustrates an example of a system for facilitating cloud-based transactions at financial self-service terminals in a framework view.

Referring to FIG. 3, there is shown a system 100, in a diagram form, for facilitating transactions and payments with a remote computing device. The system 100 may, in one arrangement, include FST computing device 105, which may be a personal computer, a server, or any computing device and/or data processing apparatus. The computing device 105 may include a circuit board 140 that may be operatively connected to a processor 110 and a memory 120. The processor 110 may execute instructions for software that may be loaded into memory 120. Processor 110 can be a number of processors, a multi-processor core, or some other type of processor, depending on the particular implementation. Further, processor 110 can be implemented using a number of heterogeneous processor systems in which a main processor is present with secondary processors on a single chip. As another illustrative example, processor 110 can be a symmetric multiprocessor system containing multiple processors of the same type.

The memory 120 and/or a storage 190 may be accessible by processor 110, thereby enabling processor 110 to receive and execute instructions stored on memory 120 and/or on storage 190. Memory 120 may be, for example, a random-access memory (RAM) or any other suitable volatile or non-volatile computer readable storage medium. In addition, memory 120 may be fixed or removable. Storage 190 may take various forms. For example, storage 190 may contain one or more components or devices such as a hard drive, a flash memory, a rewritable optical disk, a rewritable magnetic tape, or a combination of the above. Storage 190 also may be fixed or removable.

One or more software modules 130 may be encoded in storage 190 and/or in memory 120, as well as include screen displays 160, hardware operations 162, RMS 164, device security 166, and terminal agent 180. The software modules 130 may comprise one or more software programs or applications having computer program code, or a set of instructions executed in processor 110. Such computer program code or instructions for carrying out operations for aspects of the systems and methods disclosed herein may be written in any combination of one or more programming languages, including an object-oriented programming language such as Java, Smalltalk, C++, Python, JavaScript, or the like, along with any conventional procedural programming language, such as the "C" programming language or other, similar programming languages. The program code may execute entirely on computing device 105, partly on computing device 105, as a stand-alone software package, partly on computing device 105 and partly on a remote computer/device 205, or entirely on the remote computer/device or server 205. In the latter scenario, the remote computer can be connected to computing device 105 through any type of network, including a local area network (LAN) or a wide area network (WAN), or the connection may be made to an external computer (for example, through the Internet 160 using an Internet Service Provider).

One or more software modules 130, including program code/instructions, may be in a functional form on one or more computer readable storage devices (such as memory 120 and/or storage 190) that may be selectively removable. The software modules 130 may be loaded onto or transferred to computing device 105 for execution by processor 110. The program code of software modules 130 and one or more computer readable storage devices (such as memory 120 and/or storage 190) may form a computer program product.

One or more of software modules 130 may be downloaded over a network to storage 190 from another device or system via communication interface 150 for use within transaction processing system 100. For instance, program code stored in a computer readable storage device in a server may be downloaded over a network from the server to transaction processing system 100.

Absent the system and method described in this document, included among the software modules 130 is a transaction processing application that is executed by processor 110. Utilizing the system and method described in this document, the transaction processing application 230 resides on server computing device 205 and is executed by processor 210.

FIG. 3 further shows a transaction manager 230 which may reside in a service provider 200. The service provider 200 may include a server computing device 205 with a processor 210 and a memory 220.

During execution of business applications 270, and specifically the transaction manager 230, the processor 210 configures a circuit board 240 to perform various operations relating to transaction processing with computing device 205. While software module 130 may be embodied in any number of computer executable formats, in certain implementations software module 130 may comprise one or more applications that are configured to be executed at computing device 105 in conjunction with one or more applications or 'apps' executing at remote devices, such as computing device 205 and/or one or more viewers such as internet browsers and/or proprietary applications.

Furthermore, in certain implementations, one or more software modules 130 and/or transaction processing application 230 may be configured to execute at the request or selection of a user of computing device 205 (or any other such user having the ability to execute a program in relation to computing device 105, such as a network administrator), while in other implementations, computing device 105 may be configured to automatically execute software module 130 without requiring an affirmative request to execute. In addition, other information and/or data relevant to the operation of the present systems and methods (such as screen displays 160) may also be stored on storage 190.

Terminal agent 180 may be stored in storage 190. Terminal agent 180 may contain and/or maintain various data items and elements that may be used throughout the various operations of transaction processing system 100. Although terminal agent 180 is depicted as being configured locally to computing device 105, terminal agent 180 and/or various of the data elements stored therein may operate in conjunction with a terminal manager 250, which may reside remotely on server computing device 205 and may be connected to computing device 105 through network 160.

To enable the operation of terminal agent 180, which disables the legacy software in the FSS terminal and securely enables the remote host (not shown) to control operations of the FSS terminal, this disclosure identifies a unique sign-on code or private key for each brand of legacy software that creates a cryptographic handshake and secure pairing of the FSS to the remote host. The cryptographic and pairing protocols occur on each transaction to increase security and to ensure that the machine and the host are credentialled to perform the transaction. A proprietary security application programming interface ("API") (not shown) is used with keys known only to the remote host and assigned to each brand of legacy software and optionally embedded within the proprietary API.

This disclosure thereby adds to the terminal's operating system an additional layer of software that disables the application software currently resident within the FSS terminal and give permission to the remote host to command the FSS terminal, responsive to the functionality requested by the consumer. At the remote host, there may be applications for each functionality that are operative on the terminal via the proprietary permission keys and API of this disclosure.

Figure 4:
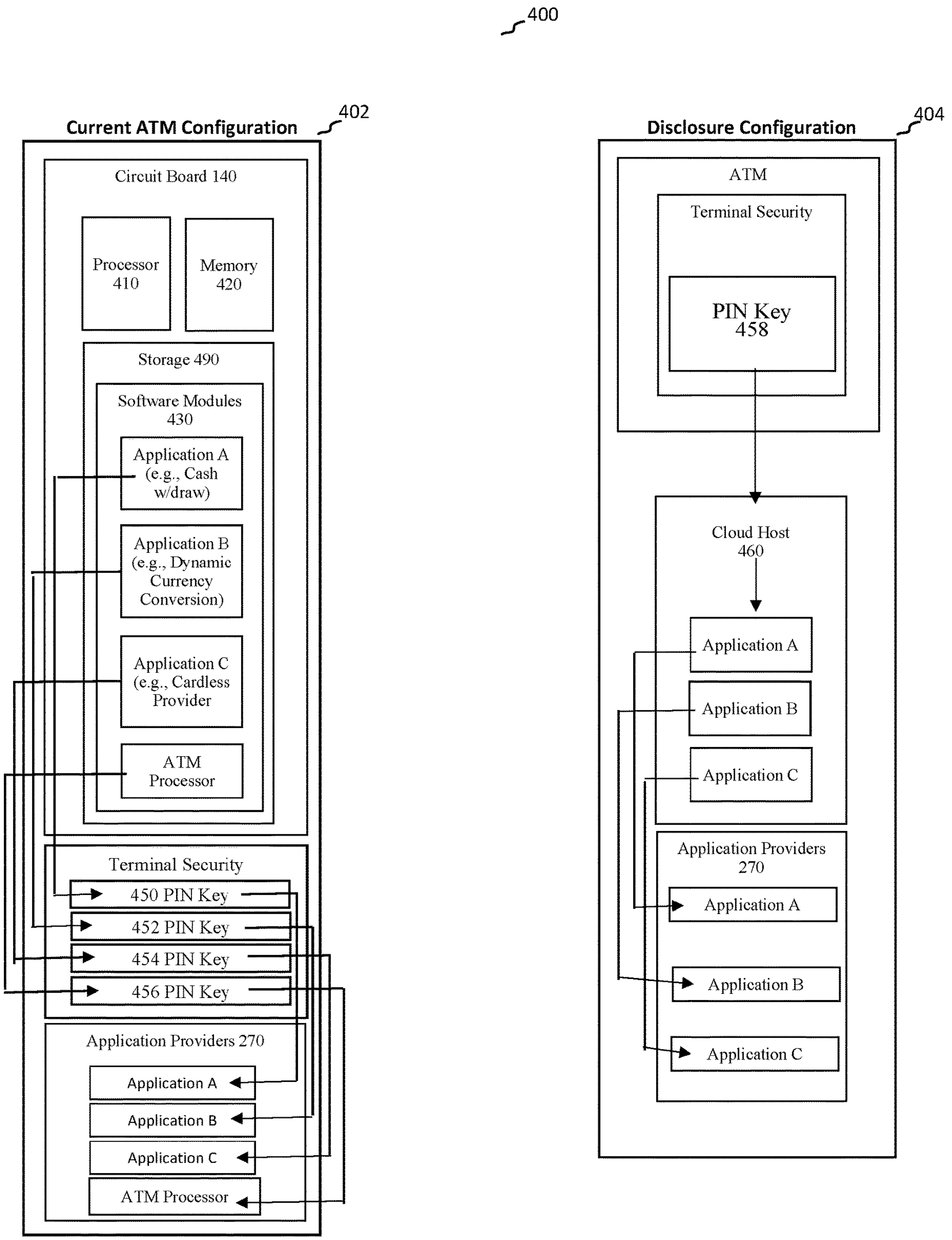
FIG. 4 illustrates an example of a system for facilitating cloud-based transactions at financial self-service terminals along with an example system of a current automated teller machine (ATM) configuration.

Another direct impact of the additional layer of software introduced to the terminal by this disclosure is to simplify the communications process that is essential to supporting multiple consumer functions at a single terminal, for example cash withdrawal, dynamic currency conversion and cardless access as shown on FIG. 4, Current ATM Configuration, in software module 430. Currently, each of these functions requires the terminal to connect to and communicate with a different processor and/or application provider (application providers 270) using different terminal security keys (PIN keys 450, 452,454 and 456), enabled via legacy software resident on the FSS terminal. The additional layer of software introduced by this disclosure provides support for all these multiple functions, and others, via single connection to the remote cloud host 460 from the terminal using a single robust PIN key 458. This creates efficiency within the terminal and in the terminal's communication protocol, eliminating the multiple endpoints now needed to connect to various application providers. The software introduced to the terminal by this disclosure provides one communication call to the cloud host, replacing multiple calls out to various functional providers, in a single format that may be managed securely within the host.

Changes to the operation of every aspect of the FSS terminal can be done one time and can be done remotely.

In certain implementations, computing devices 205 may be in periodic or ongoing communication with computing device 105 thorough a computer network such as the Internet 160. Though not shown, in other implementations, computing device 205 may be multiple devices with the same or similar interoperable capabilities of processor 210, memory 220 and circuit board 240, and transaction manager (transaction processing application) 230 and business applications 270, in periodic or ongoing direct communication with computing device 105, such as through communications interface 150.

Communication interface 150 may also operatively be connected to circuit board 240. Communication interface 150 may be any interface that enables communication between the computing device 105 and external devices, machines and/or elements. Preferably, communication interface 150 may include a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting computing device 105 to other computing devices and/or communication networks such as private networks and the Internet. Such connections can include a wired connection or a wireless connection (e.g., using the 802.11 standard). Interface 150 may be practically any interface that enables communication to/from the circuit board 140.

At various points during the operation of transaction processing system 100, computing device 105 may communicate with one or more computing devices housing business applications 270, such as those provided and/or maintained by one or more individuals and/or entities, such as service provider 200 and/or application vendor 315 and/or account holder 300. Such computing devices may transmit and/or receive data to/from computing device 105, via server computing device 205, thereby initiating, maintaining, and/or enhancing the operation of the transaction processing system 100. Computing devices 205 may be in direct communication with computing device 105, indirect communication with computing device 105, and/or may be communicatively coordinated with computing device 105. While such computing devices may be practically any device capable of communication with computing device 105, certain computing devices (e.g., that of service provider 200) may be servers, though practically any computing device that is capable of transmitting and/or receiving data to/from computing device 105 could be similarly substituted.

While FIG. 3 depicts transaction processing system 100 with respect to computing device 205, any number of computing devices may interact with the transaction processing system 100 in the manner described herein. It should be further understood that a substantial number of the operations described herein are initiated by and/or performed in relation to such computing devices. For example, as referenced above, such computing devices may execute applications and/or viewers which request and/or receive data from computing device 105, substantially in the manner described in detail herein.

In the description that follows, certain embodiments and/or arrangements are described with reference to acts and symbolic representations of operations that are performed by one or more devices, such as the transaction processing system 100 of FIG. 3. As such, it may be understood that such acts and operations, which are at times referred to as being computer-executed or computer-implemented, include the manipulation by processors 110 and 210 of electrical signals representing data in a structured form. This manipulation transforms the data and/or maintains them at locations in the memory system of the computer (such as memory 120 and 220, and/or storage 190 and 290), which reconfigures and/or otherwise alters the operation of the system in a manner understood by those skilled in the art. The data structures in which data are maintained are physical locations of the memory that have properties defined by the format of the data. However, while an embodiment is being described in the foregoing context, it is not meant to provide architectural limitations to the manner in which different embodiments can be implemented. The different illustrative embodiments can be implemented in a system including components in addition to or in place of those illustrated for the transaction processing system 100.

Other components shown in FIG. 3 can be varied from the illustrative examples shown. The different examples can be implemented using any hardware device or system capable of running program code. In another illustrative example, transaction processing system 100 may take the form of a hardware unit that has circuits that are manufactured or configured for a particular use. This type of hardware may perform operations without needing program code to be loaded into a memory from a computer readable storage device to be configured to perform the operations.

For example, computing device 105 may take the form of a circuit system, an application specific integrated circuit (ASIC), a programmable logic device, or some other suitable type of hardware configured to perform a number of operations. With a programmable logic device, the device may be configured to perform the number of operations. The device may be reconfigured at a later time, or can be permanently configured to perform the number of operations. Examples of programmable logic devices may include a programmable logic array, programmable array logic, a field programmable logic array, a field programmable gate array, and other suitable hardware devices. With this type of implementation, software modules 130 can be omitted because the processes for the different embodiments are implemented in a hardware unit.

In still another illustrative example, computing device 105 may be implemented using a combination of processors found in computers and hardware units. Processor 110 may have a number of hardware units and a number of processors that are configured to execute software modules 130. In this example, some of the processors can be implemented in the number of hardware units, while other processors can be implemented in the number of processors. In another example, a bus system can be implemented and can be comprised of one or more buses, such as a system bus or an input/output bus. The bus system may be implemented using any suitable type of architecture that provides for a transfer of data between different components or devices attached to the bus system. Additionally, communications interface 150 may include one or more devices for transmitting and receiving data, such as a modem or a network adapter.

Embodiments and/or arrangements may be described in a general context of computer executable instructions, such as program modules, being executed by a computer. Generally, program modules include routines, programs, objects, components, data structures, etc., that perform tasks or implement abstract data types.

It should be further understood that while the various computing devices and machines referenced herein, including but not limited to computing devices 105 and 205, are referred to herein as individual/single devices and/or machines, in certain implementations the referenced devices and machines, and their associated and/or accompanying operations, features, and/or functionalities may be arranged or otherwise employed across any number of devices and/or machines, such as over a network connection, as is known to those of skill in the art.

Referring to FIG. 4, there is shown a set of block diagrams 400 that shows a comparison between security processes in an FST that operates in the present configurations 402 versus an FST operating in accordance with this disclosure 404. It should be appreciated that the present configuration of an FST 402 that offers multiple functions may require multiple communications links to third parties, each of which supports a single function (e.g., via circuit board 140 containing a processor 410, a memory module 420, a storage module 490, and software modules 430). Each of those communications links may be secured with a unique PIN Key (numerals 450, 452, 454, and 456). The strength of each PIN Key determines the overall security of the FST and the extent to which the consumer using the FST is vulnerable to financial fraud. Multiple communications links to third parties provide criminals with multiple avenues to seek the "path of least resistance" for compromising the FST, for example by introducing malware that manipulates the FST's processing of transaction requests. In such a configuration, the multiple PIN Keys 450, 452, 454, and 456 have varying levels of strength and effectiveness, depending on the varying diligence of third parties to provide a robust and breach-resistant PIN Key, to maintain and refresh the PIN Keys on a regular and secure basis, and to monitor the integrity of their PIN Key(s) on an ongoing basis. That contrasts with the approach to security embodied in this disclosure, which is configured to use a single strong PIN Key 458 to access all the Functions housed at a host in a cloud configuration 460. A multiple function FST would no longer be vulnerable to security breaches that target the least effective PIN Key among many, or that result from security compromises of Application Providers. The single strong PIN Key configuration 458, which is a structural feature of this disclosure, and the single connection between the FST and the Terminal Manager 250 (see FIG. 3) provide greater protection for Functions and for users of the FST and facilitates more secure monitoring of all transactions that occur at the FST and the Cloud Host, as depicted on FIG. 4. It should also be appreciated that more or fewer operations can be performed than shown in the figures and described herein. These operations can also be performed in a different order than those described herein.

Figure 5:
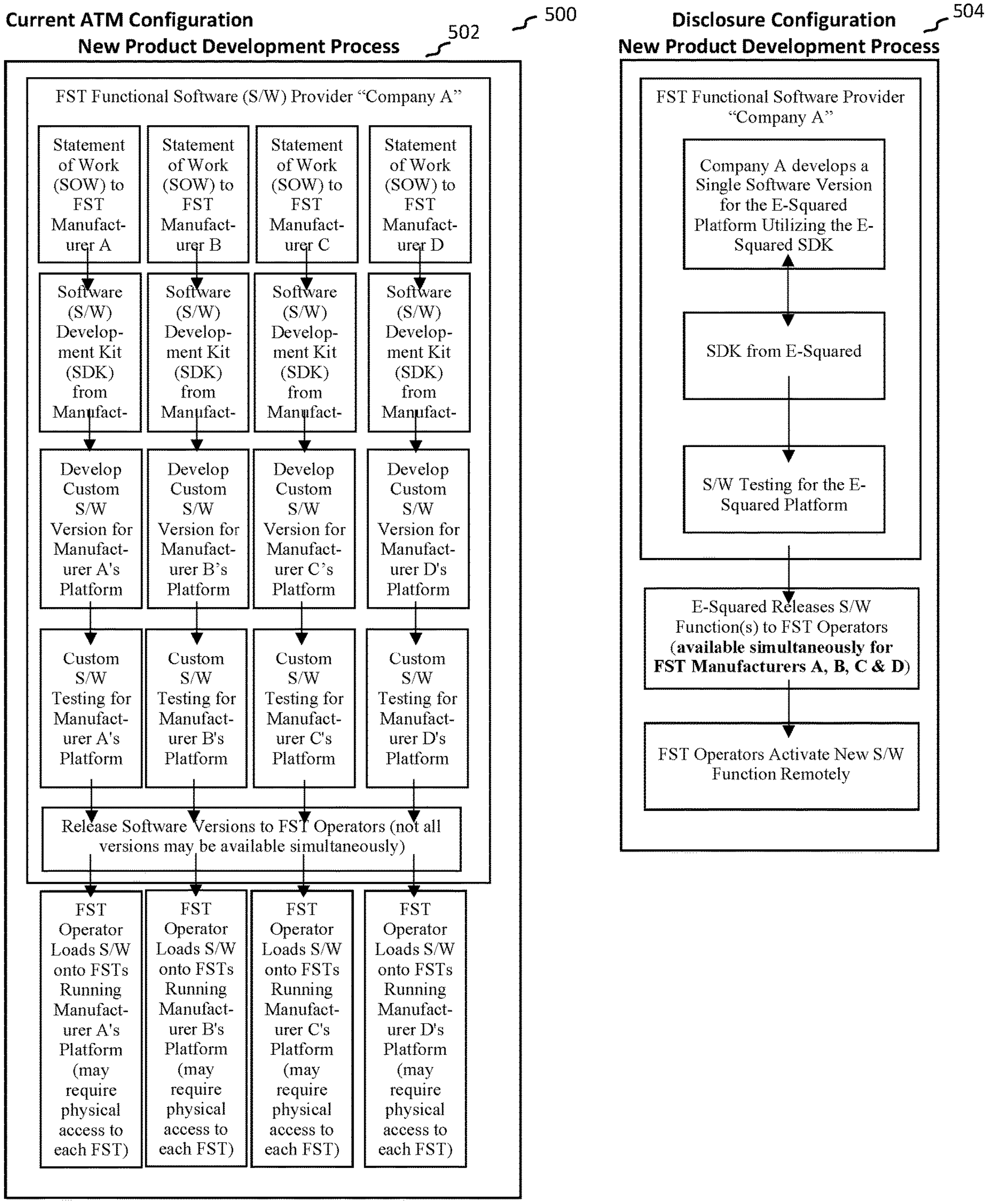
FIG. 5 illustrates an example of a method for facilitating cloud-based transactions at financial self-service terminals along with an example method of a current automated teller machine (ATM) configuration.

Turning now to FIG. 5, a set of block diagrams 500 is presented showing a comparison between application software development processes for an FST that operates in a present configuration 502 versus an FST operating in accordance with this disclosure 504. It should be appreciated that the current configuration of an FST requires multiple parallel and redundant development processes, each of which supports a single FST device manufacturer's coding system. Each of those unique coding systems requires adaptations of how the application software operates within the FST device. By contrast, all FSTs that operate in accordance with this disclosure may be able to utilize a single version of the application software, which may reside on the remote host, thereby reducing the costs and time for FST operators to deploy the application software at their FST devices. It can be appreciated that FST operators will be able to offer consumers more opportunities for new and different financial self-service functions, in a manner that does not require them to have the high levels of capital and technical expertise that are now required to deliver such functions. It can also be appreciated that, by lowering the costs to develop and deploy new and different financial functions, this disclosure will enable application developers to redirect their resources toward development of more self-service financial functions rather than multiple varieties of a single financial function, as is now necessary to adapt to the many complex varieties of FST devices in the market, thereby improving the variety and utility self-service opportunities delivered to consumers via FSTs.

Figure 6:
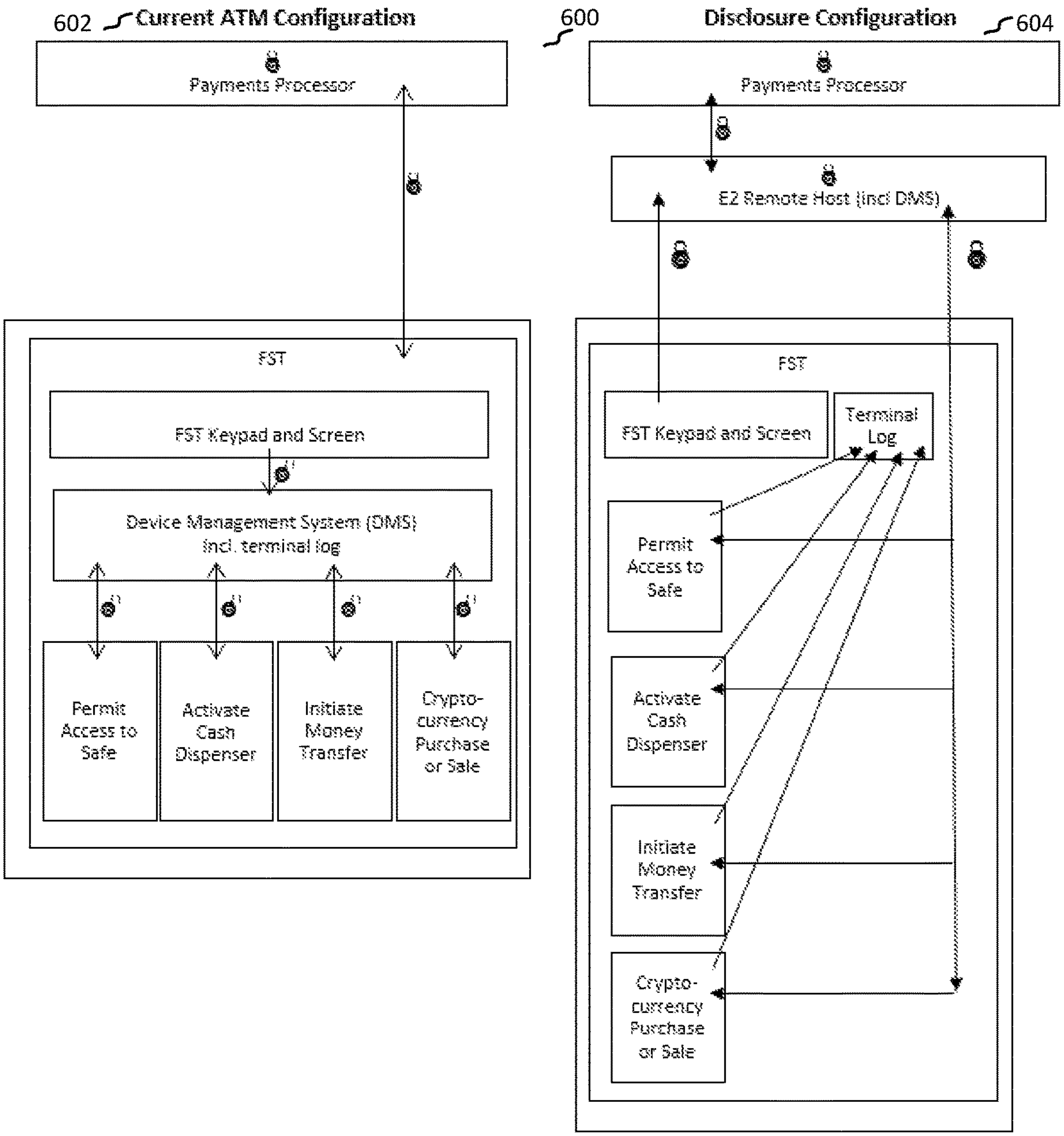
FIG. 6 illustrates another example of a method for facilitating cloud-based transactions at financial self-service terminals along with another example method of a current automated teller machine (ATM) configuration.

Turning now to FIG. 6, a set of block diagrams 600 is presented showing a comparison between the internal software processing that occurs in an FST that operates in a present configuration 602 versus an FST operating in accordance with this disclosure 604. It should be appreciated that the current configuration of an FST requires operation of a device management system (DMS) that independently issues instructions based on inputs from the consumer to actuate the functions residing in the FST, such as dispensing cash, initiating a funds transfer, or displaying information on the screen. It should be further appreciated that in the current configuration of an FST the DMS is a trusted entity and its instructions are acted upon by the FST without further verification. (Referring to FIG. 6, the insecure communications between the DMS and the various FST functions are indicated by "unlocked" symbols.) By way of example and not limitation, when a consumer initiates a request for cash disbursement, the DMS may actuate a set of operations that result in removal of currency from the safe and delivery of the currency to the consumer. DMS operations require memory capacity to reside in the FST and processing power to be completed by the FST. In addition, DMS specifications and processes differ among different makes and models of FSTs. It can be appreciated that these differences require customized versions of application software for different FSTs, which increases the complexity and redundancy of software development and distribution and increases FST operators' costs and work to add or update functionality, especially when the FST operator has FST Machines of various makes and models (as is commonly the case). It can be appreciated that the multiplicity of software programs resident in the FST also complicates the task of keeping the FST secure from manipulation by criminals, requiring a greater number of different security solutions to reside in the FST, which further increases the costly and complex memory and processing capacity requirements for an FST. This disclosure, in addition to relocating application software to a remote host, may eliminate or substantially reduce the aforementioned set of DMS operations and replace them with a set of simple binary commands that cause the FST to conduct physical actions (such as dispensing cash or displaying messages on the screen) in response to commands received from the remote host.

The block diagram presented in FIG. 6 shows a comparison between security processes and information processing for an FST that operates in the current configuration versus an FST operating in accordance with this disclosure. This disclosure may fundamentally change information processing and issuance of instructions by the DMS inside the FST (in the current FST architecture) by disabling that process, relocating information processing to the remote host, and applying strong encryption to simple commands issued by the remote host (referring to FIG. 6, the secure communications between the remote terminal manager and the various FST functions are indicated by "locked" symbols.). The remote terminal management system may replace DMS that resides inside the FST in the current configuration (except only the terminal log function that records actions taken by the FST) and thereby adds a layer of security to ensure the validity of the commands issued by the remote host, which materially diminishes the ability of criminals to fraudulently extract currency or transfer value by taking over the DMS. By removing the independent decision-making process that controls FST functions to a remote host and adding security as well as materially reducing the information processing burden on the FST, this disclosure introduces a new and unprecedented process for conducting financial transactions at an FST.

It can be seen that the principles embodied by this disclosure are consistent with a Zero Trust Architecture as described by the National Institute of Standards and Technology (NIST) of the U.S. Department of Commerce. Among those principles or tenets of this disclosure are (a) all communication is secured regardless of location within the network, (b) all resource authentication and authorization are dynamic and strictly enforced before operations are performed, and (c) the default behavior for all resources is to deny all connections and only accept connections that are explicitly allowed by system governance policies. These principles have not heretofore been incorporated into the design of how FSTs process information and execute commands.

Thus, illustrative embodiments and arrangements of the present systems and methods provide a computer implemented method, computer system, and computer program product for facilitating transactions initiated at FSTs. The flowchart and block diagrams in the figures illustrate the architecture, functionality, and operation of possible implementations of systems, methods, and computer program products according to various embodiments and arrangements, as well as the fundamental improvements in FST operations brought about by this disclosure. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

GENERAL

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present disclosure, which is set forth in the following claims.

What is claimed is:

1. A method for facilitating transactions with a remote computing device, comprising:

receiving a transaction request from a financial self-service terminal to move funds or to obtain information in furtherance of a transaction between a purchaser and a vendor;

receiving a transaction notification at the remote computing device via the financial self-service terminal, wherein the remote computing device comprises a processor, memory, and circuit board, the remote computing device being a server computing device in communication with the financial self-service terminal through a computer network, configured to execute a remote terminal manager, the transaction notification comprising a payment amount that is relevant to the transaction that is the subject of the transaction notification;

actuating a payment submission by a specified terminal agent residing in the financial self-service terminal, wherein the specified terminal agent is distinct from and operates separately from the remote terminal manager;

generating a unique identifier or a unique transaction initiation message, the unique identifier or unique transaction initiation message being in a format specified and implemented by a manufacturer of the financial self-service terminal, the unique identifier or unique transaction initiation message corresponding to the transaction notification;

actuating a function of the remote terminal manager residing in the remote computing device in order to facilitate communication of transaction instructions from the remote terminal manager to the specified terminal agent, wherein the remote terminal manager replaces a device management system residing inside the financial self-service terminal and adds a layer of security to ensure validity of commands issued by a remote host, wherein the remote terminal manager issues cryptographically verified commands to the financial self-service terminal;

performing operations based only on the cryptographically verified commands from the remote terminal manager;

disabling pre-existing software residing in the financial self-service terminal and replacing the pre-existing software with instructions that enable the financial self-service terminal to perform operations only in response to cryptographically verified commands from the remote terminal manager;

consolidating, by the remote terminal manager, multiple communication endpoints previously required to connect to various application providers into a single encrypted communication channel between the financial self-service terminal and the remote computing device;

transmitting, by the remote terminal manager, the unique identifier to actuate one or more business applications, wherein the transmitting causes manipulation of electrical signals representing data by the processor and the memory of the remote computing device;

providing the unique identifier to a service provider via the remote computing device to facilitate remote processing of the information in furtherance of the transaction; and associating the unique identifier with a user account to facilitate completion and record-keeping.

2. The method as claimed in claim 1, further comprising receiving an input of the unique identifier at a remote server, wherein the unique identifier corresponds to the transaction notification and actuates business applications to perform the transaction request.

3. The method as claimed in claim 2, wherein the transaction request is submitted for information and for notifying the vendor and/or an account holder.

4. The method as claimed in claim 3, further comprising eliciting the transaction request at an automated teller machine or other financial self-service terminal and processing the transaction request at the remote server.

5. The method as claimed in claim 1, further comprising:

establishing a connection to a circuit board located within the financial self-service terminal;

permitting a remote host to control operations of the financial self-service terminal;

providing an application programming interface configured to be operated by the remote host;

providing one or more proprietary permission keys known only to the remote host and configured to enable application functionality on the financial self-service terminal by the remote host; and disabling legacy software in the financial self-service terminal.

6. A system for facilitating transactions and payments with a remote computing device, the system comprising:

a remote computing device comprising a server computing device including a processor, memory, and circuit board, the remote computing device being in communication with the financial self-service terminal through a computer network;

a remote terminal manager residing in the memory and executable by the processor;

a terminal agent residing in the financial self-service terminal and connected to the remote terminal manager through the computer network, wherein the terminal agent is distinct from and operates independently of the remote terminal manager;

the processor of the remote computing device being configured to interact with a computer-readable medium for performing operations, the operations comprising:

receiving a transaction request from the financial self-service terminal to move funds or to obtain information in furtherance of a transaction between a purchaser and a vendor;

receiving a transaction notification at the remote computing device via the financial self-service terminal, the transaction notification comprising a payment amount that is relevant to the transaction that is the subject of the transaction notification;

actuating a payment submission by the terminal agent residing in the financial self-service terminal;

generating a unique identifier or a unique transaction initiation message, the unique identifier or unique transaction initiation message being in a format specified and implemented by a manufacturer of the financial self-service terminal, the unique identifier or unique transaction initiation message corresponding to the transaction notification;

receiving an input of the unique identifier at a remote server;

actuating a function of the remote terminal manager to facilitate bidirectional communication of transaction instructions between the remote terminal manager and the terminal agent, wherein the remote terminal manager replaces a device management system residing inside the financial self-service terminal to and adds a layer of security to ensure validity of commands issued by a remote host, wherein the remote terminal manager issues cryptographically verified commands to the financial self-service terminal, and the financial self-service terminal performs operations only in response to the cryptographically verified commands from the remote terminal manager; disabling pre-existing software residing in the financial self-service terminal and replacing the pre-existing software with instructions that enable the financial self-service terminal to perform operations only in response to cryptographically verified commands from the remote terminal manager;

consolidating, by the remote terminal manager, multiple communication endpoints previously required to connect to various application providers into a single encrypted communication channel between the financial self-service terminal and the remote computing device;

transmitting, by the remote terminal manager, the unique identifier to actuate one or more business applications for processing; transaction request, wherein the actuation causes manipulation of electrical signals representing data by the processor and the memory of the remote computing device;

providing the unique identifier to a service provider to facilitate remote processing of the information in furtherance of the transaction;

associating the unique identifier with a user account to facilitate completion and record-keeping;

executing the transaction request on behalf of the financial self-service terminal; and notifying an account holder and/or application vendor of execution of the transaction;

and one or more remote monitoring programs and systems (RMS) configured to act with and through the terminal manager in order to keep under systematic review and record the operations of the financial self-service terminal pursuant to monitoring applications residing at the financial self-service terminal and the remote server.

* * * * *